3,507,878
PROCESS FOR THE RECOVERY OF
2-ETHYL-2-OXAZOLINE
William D. Griffin, Morristown, Leon J. Schmehl, Lincoln Park, and Salvatore A. Casale, Morris Plains, N.J., assignors to Allied Chemical Corporation, New York, N.Y., a corporation of New York
No Drawing. Filed July 24, 1967, Ser. No. 655,292
Int. Cl. C07d 85/36, 87/06
U.S. Cl. 260—307          5 Claims

ABSTRACT OF THE DISCLOSURE

Low molecular weight oxazines and oxazolines may be separated from admixtures thereof with water by extraction of the mixture with diisopropyl benzene.

This invention relates to a process for the purification of oxazines and oxazolines and more particularly to a process for separating low molecular weight oxazines and oxazolines from water or from mixtures of water and N-(ω-hydroxyalkyl) amides.

Current processes for the preparation of oxazines and oxazolines such as the cyclodehydration of N-(ω-hydroxyalkyl) amides or the cyclodehydrohalogenation of N-(ω-chloroalkyl) amides with sodium carbonate (disclosed in copending U.S. application No. 450,163) afford the crude oxazine or oxazoline product in admixture with water. If the former preparative procedure is utilized, some uncyclized N-(ω-hydroxyalkyl) amide is also present in the crude oxazoline or oxazine-water mixture. Mixtures of water and oxazoline or oxazine are not thermally stable, i.e., attempts to separate the two by atmospheric distillation results in hydrolysis of oxazoline or oxazine back to hydroxy amide. Even when using known methods of recovery such as adding benzene and azeotroping off the water, some hydrolysis occurs, the extent depending upon the temperature, pressure, and duration of the distillation. Azeotropic methods also usually require the use of large volumes of the entraining agent.

It is an object of this invention to provide a simple and convenient process for the separation of oxazines and oxazolines from admixtures thereof with water which will not cause tthe oxazine or oxazoline to undergo hydrolysis.

Further objects and advantages will become apparent from the description of the invention which follows in greater detail.

These and other objects are accomplished according to our invention wherein the desired oxazine or oxazoline is separated from the crude reaction product resulting from the cyclodehydration or cyclodehydrohalogenation of ω-hydroxy or ω-halo amides by extraction of the crude product with at least an equivalent volume of diisopropyl benzene at approximately ambient temperature. The diisopropyl benzene contains the major portion of the oxazine or oxazoline which was present in the crude reaction product. The oxazoline or oxazine may be recovered undecomposed from the diisopropyl benzene by simple distillation. An aqueous layer is formed in the extraction, containing the by-product water and small amounts of the oxazoline. Where the cyclodehydration reaction is used, unreacted N-(ω-hydroxyalkyl) alkylamide is also present in the aqueous layer. Refluxing this aqueous layer for a short time hydrolyzes the small amount of the oxazoline or oxazine present back to hydroxy amide; the water may then be distilled off and the residue consisting exclusively of N-(ω-hydroxyalkyl) alkylamide can be recycled to the dehydrocyclization reactor.

In the preferred embodiment of this invention the extraction is carried out using a counter-current extraction column.

Either o-, m-, or p-diisopropyl benzene or mixtures thereof may be used. Surprisingly, all other extraction solvents are distinctly inferior. For example, cumene extracted over one half of the water in the crude product along with the oxazine or oxazoline. Water would not separate out of an ethereal solution of a crude oxazoline and ether would not extract oxazoline from aqueous solution. Acetophenone also would not separate an oxazoline from water. Ortho- or para-chlorotoluene gave emulsions with mixtures of oxazoline and water.

2-substituted oxazolines which may suitably be purified by the process of this invention are 2-methyl, ethyl, propyl and butyl; suitable 2-oxazines are 2-methyl, 2-ethyl and 2-propyl.

The following specific examples further illustrate our invention. All parts are parts by weight unless otherwise expressly noted.

EXAMPLE 1

Preparation and recovery of 2-ethyl-2-oxazoline using tungstic acid catalyst

N-(β-hydroxyethyl)propionamide was prepared by reacting propionic acid with ethanolamine; excess ethanolamine and the water formed in the reaction were distilled off under vacuum and the residue consisted of crude N-(β-hydroxyethyl) propionamide of about 96.7% purity.

Crude N-(β-hydroxyethyl)propionamide was dehydrated and cyclized by feeding 2143 grams of thte hydroxyamide to a pot containing 7.5 grams of tungstic acid ($WO_3$—$H_2O$) catalyst suspended by magnetic stirrer in 50 cc. of the hydroxyamide. The reactor was maintained at about 209° to 216° C. at a pressure of 151 mm. of mercury. The crude hydroxyamide was fed dropwise at an average rate of 5.8 grams/min. over a period of 6.1 hours. Vapors from the reactor were passed through an 18-inch Vigreaux column to prevent large amounts of unreacted hydroxyamide from distilling over wtih the 2-ethyl-2-oxazoline and water reaction products, which were condensed and collected. After all the crude hydroxyamide had been fed to the reactor, the pot temperature was brought up to 261° C. at 152 mm. over a half hour period. The total distillate collected, mostly ethyl oxazoline and water, weighed 1994 grams. The reactor residue weighed 150 grams.

1930 grams of the crude distillate (1800 cc.) was extracted with 1800 cc. of p-diisopropyl benzene. This gave an organic layer, which was removed, and 1325 cc. of an aqueous layer. This aqueous layer was then extracted batchwise four times, using 300 cc. of p-diisopropyl benzene in each extraction. The resulting five organic layers were combined and totalled 3480 grams. The final aqueous layer measured 915 grams (890 cc.).

The organic layer was vacuum fractionated through a 2-foot packed column giving 61 grams of forecut, 826 grams of prime cut of ethyl oxazoline (99+% purity), and 108 grams of hindcut. The Dry Ice trap contained 22 grams, and the residue, mostly p-diisopropyl benzene, weighed 2436 grams.

Vapor phase chromatographic analysis of the aqueous layer from the extraction showed it to contain about 10.7% ethyl oxazoline, 55% hydroxyamide, and 1.8% p-diisopropyl benzene. This material (915 grams) was refluxed for 6 hours to hydrolyze the oxazoline, then vacuum distilled through an 18-inch Vigreaux column. 170 grams of distillate was collected up to a pot temperature of 146° C. at 9 mm. Hg; VPC analysis showed it to contain 138 grams of water. The residue weighed 732 grams, being mostly hydroxyamide.

These data show that 63% of the hydroxyamide fed was consumed; 732 grams, or 37% was recovered and could be recycled. 841 grams of ethyl oxazoline in the distillates from the organic extract correspond to a yield of 83% basis hydroxyamide consumed.

EXAMPLE 2

Preparation and recovery of 2-ethyl-2-oxazoline using sodium tungstate catalyst

Crude (95%) N-($\beta$-hydroxyethyl)propionamide was dehydrated and cyclized by feeding 2373 grams of the hydroxyamide into a reactor containing 7.5 grams of sodium tungstate ($Na_2WO_4 \cdot 2H_2O$) suspended by a magnetic stirrer in 50 cc. of the hydroxyamide. The reactor was maintained at about 212°–218° C. at a pressure of 153 mm. of Hg. The crude hydroxyamide was fed dropwise at an average rate of 5.5 g./min. over a period of 7.2 hours. Vapors from the reactor were passed through a 1-inch diameter, 18-inch long Vigreaux column to prevent large amounts of unreacted hydroxyamide from distilling over with the 2-ethyl-2-oxazoline and water reaction products, which were condensed and collected. The distillate came over at a temperature of 77°–87° C. at a pressure of 153 mm. of Hg. When all of the hydroxyamide had been fed to the reactor, the reaction mixture temperature was increased to 234° C., and additional distillate collected at a temperature of 111° C. (the pressure being maintained at 153 mm.). At the end of the reaction 2243 grams of distillate had been obtained and the reactor contained 150 grams of residue. Analysis of the distillate by gas chromatography showed it to contain 12.7% water, 66.5% 2-ethyl-2-oxazoline, and 10.1% N-($\beta$-hydroxyethyl)propionamide. This amounted to 285 g. (15.8 mols) water, 1490 g. (15.1 mols) oxazoline, and 227 g. (1.9 mols) of hydroxyamide.

1006 grams of the crude distillate was extracted once with 1000 cc. of p-diisopropyl benzene and the aqueous and organic layers separated. The resulting aqueous layer was then extracted with five successive 200 cc. portions of p-diisopropyl benzene and these extracts combined with the initial extract to give 2334 grams of p-diisopropyl benzene solution. The remaining aqueous solution amounted to 369 grams (360 cc.) and VPC analysis showed it to contain 24.5% water (90 g.), 12.5% 2-ethyl-2-oxazoline (46 g.), 48.7% (180 g.) hydroxyamide, and 7.8% (29 g.) of other material.

The p-diisopropyl benzene extract (2334 g.) was passed through 300 g. of a Linde 4A molecular sieve to remove retained water and filtered using a wash of 400 cc. of p-diisopropyl benzene. 2560 grams of solution was obtained. This was distilled through a 2-foot column packed with ¼-inch glass helices and fitted with a reflux head. Distillation at a pot temperature of 125° C. at 51 mm. of Hg pressure yield three fractions: 36 grams distilling at 53°–57° C., 525 grams distilling at 56°–57° C. and 45 grams distilling at 57°–120° C.

Analysis of the fractions showed them to contain 35.5 g., 525 g. and 19 g. of 2-ethyl-2-oxazoline, with 25.5 g. of p-diisopropyl benzene in the last fraction, respectively. The yield of pure oxazoline was 560.5 grams. Since only 1006 g. of the 2243 g. of original distillate (44.9% of the 1490 g. of oxazoline in the distillate) was worked up, the overall yield of pure oxazoline would be 83%.

EXAMPLE 3

Preparation and recovery of 2-butyl-2-oxazoline using tungstic acid catalyst

N-($\beta$-hydroxyethyl) valeramide was prepared by reacting valeric acid with ethanolamine; excess amine and the water formed in the reaction were distilled out under vacuum, leaving the crude valeramide as residue.

The crude N-($\beta$-hydroxyethyl) valeramide was dehydrated and cyclized by feeding 621 g. of the amide to a pot containing 3 g. of tungstic acid suspended in 50 g. of the amide. The reactor was maintained at about 210–220° C. at a pressure of 145 mm. Hg. The crude amide was fed over a period of 2.6 hours, at an average rate of 4 g./min. Vapors from the reactor were passed through an 18-inch Vigreaux column, then condensed and collected. After all the amide had been fed to the reactor, the pressure was gradually decreased to 14 mm. Hg. A total of 537 g. of distillate was collected, plus 9 g. in the Dry Ice trap; the reactor residue weighed 120 g.

The distillate was extracted with 500 cc. m-diisopropyl benzene, giving 120 cc. of aqueous layer. This aqueous layer was re-extracted twice with 100 cc. portions of m-diisopropyl benzene the organic extract in each case being added to the original organic layer. The final aqueous layer weighed 60 g., and the final organic solution weighed 1110 g. The organic solution was fractionated through a 1-foot column packed with ¼-inch glass helices, giving 34 g. of forecut (38–89° C. at 47 mm. Hg), 397.5 g. of prime cut butyl oxazoline (91–98° C. at 51 mm.), and 69 g. of end cut (98–112° C. at 50 mm.). The trap contained 16 g. of condensate, and the residue (mostly m-diisopropyl benzene) weighed 583 g. The recovery of prime cut butyl oxazoline in this case was 68%, based on initial N-($\beta$-hydroxyethyl) valeramide fed to the cyclizer.

EXAMPLE 4

Preparation and recovery of 2-isobutyl-2-oxazoline using tungstic acid catalyst

In an experiment identical to that of Example 3, N-($\beta$-hydroxyethyl) isovaleramide was synthesized from isovaleric acid and ethanolamine, and the resultant crude amide was cyclized by feeding 627 g. to a pot containing 3 g. of tungstic acid in 50 g. of amide at about 220° C. at 150 mm. Hg, with an average feed rate of 5.3 g./min. The 528 g. of distillate was extracted with 525 cc. of p-diisopropyl benzene, and the 174 cc. of resulting aqueous layer was extracted first with 200 cc. p-diisopropyl benzene, then twice more with 100 cc. portions of p-diisopropyl benzene. This gave a final aqueous layer of 98 g. and a combined organic extract totaling 1280 g. Fractionation of the latter gave 369 g. of prime cut isobutyl oxazoline (80–101° C. at 50 mm. Hg), representing a 63% recovery based on hydroxyamide fed to the cyclizer.

EXAMPLE 5

Preparation of 2-valeric-2-oxazoline using tungstic acid catalyst

In an experiment similar to Examples 3 and 4, N-($\beta$-hydroxyethyl) hexanoamide was synthesized from hexanoic acid and ethanolamine. The crude amide was dehydrated and cyclized over tungstic acid at about 195–200° C. at 25–50 mm. Hg. The distillate collected, weighed 489 g., and the Dry Ice trap contained 43 g., mostly water. Karl Fisher analysis of the distillate showned it to contain 4% water. When equal volumes of distillate and p-diisopropyl benzene were shaken together, no water layer separated out.

EXAMPLE 6

Preparation and recovery of 2-ethyl-2-oxazine 700 grams of crude 2-ethyl-2-oxazine was prepared from N-($\eta$-hydroxypropyl)propionamide using sodium tungstate catalyst. VPC analysis of the crude oxazine indicated it to be a mixture containing 76% oxazine, 10% hydroxyamide, 11% water and 3% unidentified products. Purification was carried out using a 4-foot long ¾-inch diameter countercurrent extraction column packed with 3 mm. glass beads, and equipped with a bottom stopcock, a side injection port 5-inches from the bottom and a withdrawal port 2-inches from the top. 1.8 cc./min. of the crude oxazoline was fed into the top of the column and 3.5 cc./min. p-diisopropyl benzene was fed into the column through the bottom injection port. The aqueous effluent was drawn off through the bottom stopcock and the organic effluent through the top exit port. This organic effluent contained 97% of the oxazine and 14% of the water fed into the column. Distillation afforded pure 2-ethyl-2-oxazine in 89% yield based upon oxazine fed.

We claim:
1. A process for the separation of compounds of the formula

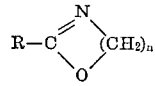

wherein $n$ is 2 to 3 and wherein R is a $C_1$ to $C_4$ alkyl group when $n$ is 2 and a $C_1$ to $C_3$ alkyl group when $n$ is 3, from admixtures thereof with contaminants selected from the group consisting of water and water plus

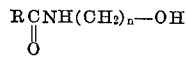

wherein R and $n$ are defined as above, which comprises extracting said admixture at approximately ambient temperature with at least an equivalent volume of diisopropyl benzene.

2. A process in accordance with claim 1 wherein the compound is 2-ethyl-2-oxazoline.

3. A process in accordance with claim 1 wherein the contaminant consists essentially of water plus

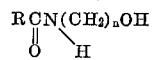

wherein R and $n$ are defined as in claim 1.

4. A process in accordance with claim 1 wherein the major portion of the diisopropyl benzene is the para isomer.

5. A process in accordance with claim 1 wherein said extraction is carried out using a countercurrent extraction column.

References Cited
UNITED STATES PATENTS 3,312,714   4/1967   Eisenbraun _____ 260—307

FOREIGN PATENTS 758,972   10/1956   Great Britain.

ALEX MAZEL, Primary Examiner

R. V. RUSH, Assistant Examiner

U.S. Cl. X.R.

260—244